UNITED STATES PATENT OFFICE.

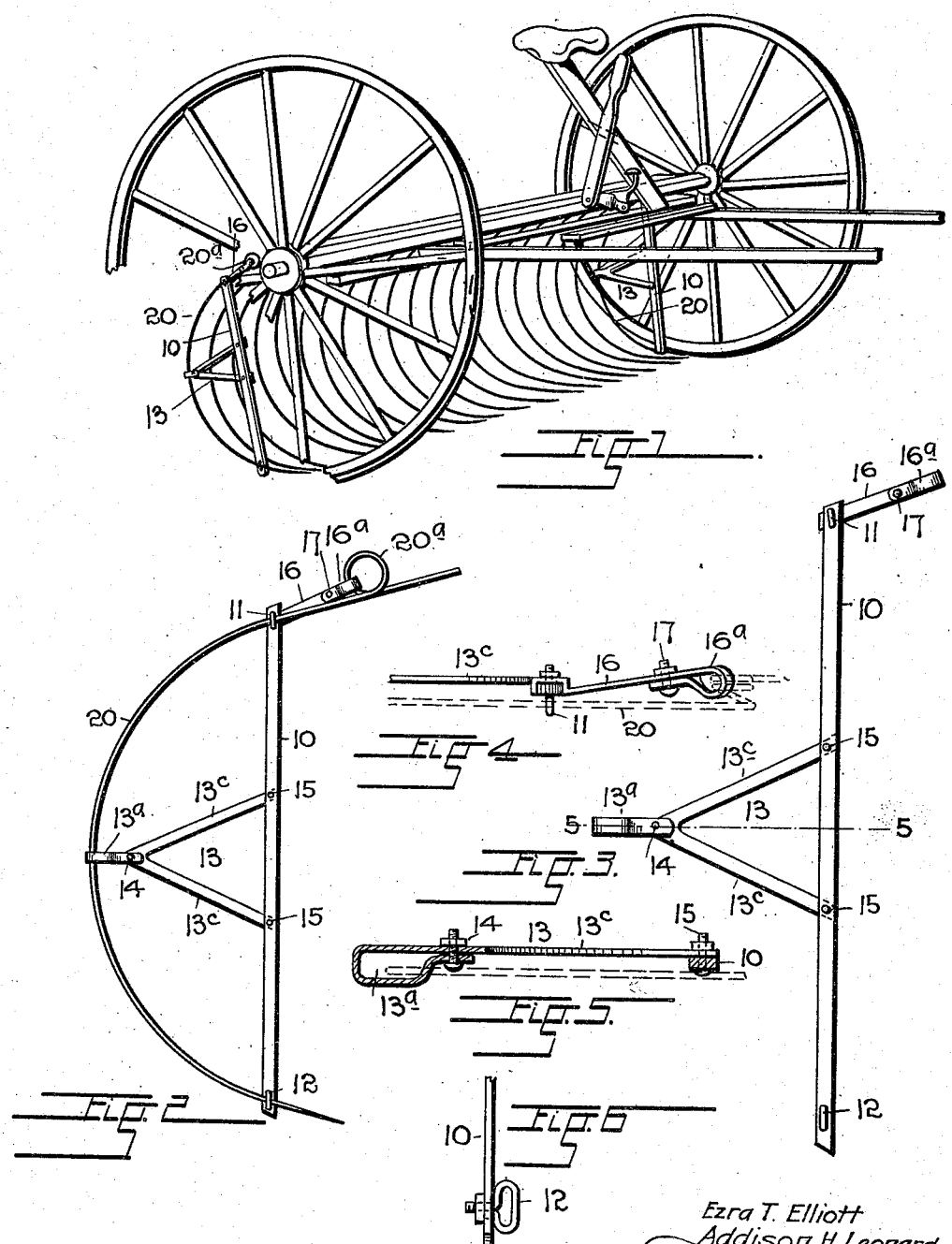

EZRA T. ELLIOTT AND ADDISON H. LEONARD, OF DEL NORTE, COLORADO.

ATTACHMENT FOR HAY-RAKES.

No. 840,612.    Specification of Letters Patent.    Patented Jan. 8, 1907.

Application filed February 28, 1906. Serial No. 303,466.

*To all whom it may concern:*

Be it known that we, EZRA T. ELLIOTT and ADDISON H. LEONARD, citizens of the United States of America, residing at Del Norte, in the county of Rio Grande and State of Colorado, have invented certain new and useful Improvements in Attachments for Hay-Rakes, of which the following is a specification.

This invention relates to attachments for hay-rakes, and has for its object the provision of guards adapted to be readily secured to the end teeth of a horse-rake and which when so placed will effectually prevent the raked hay from spilling through the ends of the rake. By thus retaining the hay and throwing it toward the center of the row of teeth our attachments obviate the necessity of going over the ground more than once, as is generally done, to gather the so-called "scatterings," while they prevent heavy alfalfa and similar products from tangling in the wheels.

We attain our objects by the mechanism illustrated in the accompanying drawings, in the various views of which like parts are similarly designated, and in which—

Figure 1 represents a perspective view of a horse or sulky rake provided with our attachments; Fig. 2, a side elevation of one of the guards secured to a rake-tooth; Fig. 3, an enlarged side view of one of the detached attachments; Fig. 4, an enlarged fragmentary top view of the device; Fig. 5, an enlarged section taken along a line 5 5, Fig. 3; and Fig. 6, an enlarged side view of the lower extremity of the device.

Our attachment, two of which are used on each rake, consists of a bar or strap 10, composed of wood, metal, or other suitable substance and adapted to be secured across an end tooth 20 of a rake by means of the eyebolts 11 and 12, respectively, extending through apertures in its outer extremities. A bifurcated V-shaped brace 13 extends laterally from bar 10 substantially midway between its extremities and consists of the looped strap 13$^a$, the extremity of which is secured by means of a bolt 14 and from which extend the integral diverging arms 13$^c$ and 13$^c$, the extreme ends of which are attached to bar 10 by means of bolts 15. The bar is furthermore provided with a laterally-extending short arm 16, one end of which is secured to the upper extremity of bar 10 by means of the before-mentioned eyebolt 11, while its opposite extremity is bent to form a loop 16$^a$ and may be secured by a bolt 17. Both the brace 13 and the arm 16 are preferably composed of light spring-steel for the main purpose of rendering loops 13$^a$ and 16$^a$ sufficiently resilient to partly open when bolts 14 and 17 are withdrawn.

The attachment is placed on the rake-tooth 20 by inserting the latter consecutively through eye 11, loop 13$^a$, and the eye of bolt 12, after which loop 16$^a$ is snapped over the tooth-coil 20$^a$ and its end secured by bolt 17. When thus arranged, bar 10 intersects the curved tooth in proximity to its extremities and forms a chord to its arc, while brace 13, extending laterally from bar 10, connects the latter with the tooth at a point approximately midway of the points of intersection with the bar. Arm 16, connecting the upper end of the bar with the coil 20$^a$, effectively holds the former against displacement.

It will be observed that loop 13$^a$ of brace 13, as well as the eye of bolt 12, are elongated to permit free movement of the resilient rake-tooth. We wish it furthermore understood that brace 13 and arm 16, which have been shown to be detachable from bar 10, may be made integral therewith and that the construction and arrangement of the parts comprised in our device may be modified to suit varying forms of teeth and different makes of rakes.

Having thus described our invention, what we claim is—

1. A device of the class described comprising in combination with the rake, rigid bars attached to the exterior teeth thereof at one of their extremities and loosely connected therewith at their opposite ends so as to permit independent movement of the therewith-intersecting portions of the teeth.

2. A device of the class described, comprising in combination with a rake having coiled teeth, rigid bars attached at their extremities to the exterior teeth thereof, and arms connecting the upper portions of the said bars with the coils of the said teeth.

3. A device of the class described, comprising in combination with the rake, three-armed guards, secured to the exterior teeth thereof at the extremities of their upper arms, the ends of said other arms being loosely connected with the adjacent portions of the teeth.

In testimony whereof we have affixed our signatures in presence of two witnesses.

EZRA T. ELLIOTT.
    ADDISON H. LEONARD.

Witnesses:
 J. H. WEISS,
 ANTONIO T. VALDEZ.